N. Thompson,
Making Staves.

Nº 61,121. Patented Jan. 8, 1867.

Witnesses.

Inventor.

United States Patent Office.

NATHAN THOMPSON, OF ST. JOHN'S WOOD, ENGLAND.

Letters Patent No. 61,121, dated January 8, 1867.

---

IMPROVEMENT IN BORING-TOOLS.

---

The Schedule referred to in these Letters Patent and making part of the same.

---

TO ALL TO WHOM IT MAY CONCERN:

Be it known that I, NATHAN THOMPSON, of 15 Abbey Gardens, St. John's Wood, a citizen of the United States of America, have invented or discovered new and useful "Improvements in Tools for Dividing Wood into Cylinders;" and I, the said NATHAN THOMPSON, do hereby declare the nature of the said invention, and in what manner the same is to be performed, to be particularly described and ascertained in and by the following statement thereof; that is to say—

My invention has for its object improvements in tools for dividing wood into cylinders. For this purpose I employ a tool consisting of one or more cylinders of steel mounted on an axis, to which rapid rotary motion is given in any suitable manner. These cylinders are made of thin tempered steel of a similar thickness to that employed in the manufacture of steel pens, and when more than one cylinder is employed they are kept at suitable distances apart by short tubes of brass or other suitable material, all the cylinders and tubes being kept in position on the shaft or axis by a pin or cotter passed there-through. And I prefer that such shaft or axis be provided with a male or female screw to screw into or upon the spindle or shaft of a lathe-head or other suitable shaft receiving rotary motion by a strap or band from a steam engine or other suitable power. The wood to be divided into cylinders has a hole bored there-through to fit on to the shaft or axis around which the thin steel cylinders are fixed. The wood is then, by hand or other suitable means, brought gradually up to the end of the steel cylinders until they shall have entered to the required extent, when the wood is withdrawn and the cylinders removed from the block of wood by a cross cut from a circular saw, or otherwise; when employing only one steel cylinder and operating upon small diameters, no central guide will be necessary. The woods which I prefer to employ are soft woods, such as willow, pine, alder, bass, poplar, &c.

And in order that my invention may be more fully understood and readily carried into effect I will proceed to describe, aided by the accompanying drawings, the means I have found to answer in carrying the same into effect.

Figure 2:
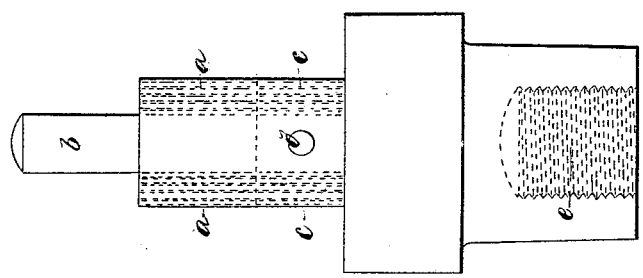
Figure 2 is a side view.
Figure 1:
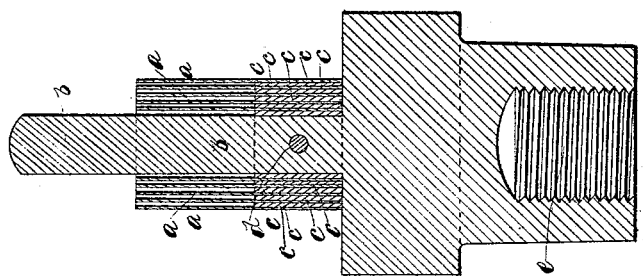
Figure 1 is a section.
Figure 3:
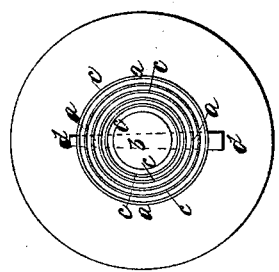
Figure 3 is an end view of a tool constructed according to my invention.

$a\ a$ are thin cylinders of steel of a similar thickness to that employed in the manufacture of steel pens. These cylinders are mounted on the shaft or axis $b$, and are divided the one from the other and kept at suitable distances apart on the shaft or axis $b$ by short tubes or cylinders $c$, which may be of brass or other suitable material. A pin or cotter, $d$, acts to keep the thin steel cylinders $a$ and the short tubes or cylinders $c$ in position on the shaft or axis $b$; and in order that the tool may be capable of being readily applied to or removed from a shaft or spindle of a lathe-head or other suitable shaft, a female screw, $e$, (or it may be a male screw,) is formed thereon so that it may be readily screwed and unscrewed from such shaft. Other suitable means of securing the tool to such revolving-shaft may, however, be employed. The wood to be divided into cylinders has bored therein a hole corresponding in diameter with the shaft or axis $b$ in such manner that when such wood is to be operated upon by the tool the wood may be first passed on to the end of the shaft or axis $b$, which serves as a guide; and then, either by hand or other suitable power, the wood may be caused to approach the tool or the tool may be caused to approach the wood until the thin steel cylinders have entered the wood to the desired extent, or so far as the short tubes or cylinders $c$ will allow when the wood is withdrawn from the tool, and by cross-cutting by a circular saw or other suitable means the cylinders are removed from the block of wood operated upon. Cylinders of wood of different thicknesses and different diameters may be produced by varying the diameters of the thin steel cylinders $a$ and the thicknesses of the short tubes or cylinders $c$. Although, in the drawing, I have shown the tool to consist of several steel cylinders $a$, only one of such cylinders may be employed, and when operating upon small diameters by such a tool no central guide $b$ will be required; and in this case the steel cylinder may be capable of sliding on its shaft in order to withdraw it from the wood operated upon. By these means wood may be divided into cylinders with less waste than by other means, which cylinders may be employed in the manufacture of boxes and for various other purposes. The woods which I prefer are soft woods, such as willow, pine, alder, bass, poplar, &c.

Having thus described the nature of my said invention and the means I have found to answer in carrying the same into effect, I would have it understood that I do not confine myself to the precise details herein shown and described; but what I claim, is—

1. The construction of a tool of a thin cylinder and axis for cutting a hollow cylinder out of wood, substantially as herein shown and described; and 2. I claim the employment of thin steel cylinders $a$ and short tubes or cylinders $c$ for cutting a series of hollow cylinders out of wood, in the manner and for the purpose substantially as herein shown and described.

NATHAN THOMPSON.

Witnesses:
JAMES E. NAYLOR,
JAMES CAMPBELL.